United States Patent

Bones

[11] Patent Number: 6,145,666
[45] Date of Patent: Nov. 14, 2000

[54] CLEANSING CONTAMINANTS FROM A HETEROGENEOUS MATERIAL USING A SORPTION AGENT

[75] Inventor: Oyvind Bones, Solheimsviken, Norway

[73] Assignee: Sphagnum A/S, Solheimsviken, Norway

[21] Appl. No.: 09/171,272

[22] PCT Filed: Apr. 16, 1997

[86] PCT No.: PCT/NO97/00099

§ 371 Date: Oct. 16, 1998

§ 102(e) Date: Oct. 16, 1998

[87] PCT Pub. No.: WO97/38805

PCT Pub. Date: Oct. 23, 1997

[30] Foreign Application Priority Data

Apr. 17, 1996 [NO] Norway ..................................... 961511

[51] Int. Cl.[7] ..................................................... B03B 1/00
[52] U.S. Cl. ........................ 209/4; 209/7; 209/9; 209/11; 209/133; 209/142
[58] Field of Search .................................... 209/4, 3, 7, 9, 209/11, 142, 133

[56] References Cited

U.S. PATENT DOCUMENTS 4,869,825  9/1989  Steiner .................................... 210/634
5,041,211  8/1991  Koszalka ................................. 209/164
5,453,133  9/1995  Sparks et al. .......................... 134/25.1

FOREIGN PATENT DOCUMENTS 4208591  9/1993  Germany.
9215372  9/1992  WIPO.
9218991  10/1992  WIPO.
9305895  4/1993  WIPO.

*Primary Examiner*—Donald P. Walsh
*Assistant Examiner*—Jonathan R Miller
*Attorney, Agent, or Firm*—Fulbright & Jaworski LLP

[57] ABSTRACT

There is described a process for cleansing contaminants, such as oil, PCB, PAH, heavy metals and the like, from a heterogeneous material, such as sand, gravel, earth, oil gravel, asphalt, drill borings ("kaks") and the like. More specifically the invention relates to a process comprising the steps: i) that a sorption agent is added to the material, and that the material and the sorption agent are mixed/kneade sufficiently for a considerable portion of the contamination to be extracted from the material and absorbed by the sorption agent, and that ii) thereafter the sorption agent is separated from the material on the basis of specific gravity/particle size by means of an applied flow of gas, so that the sorption agent is led with the flow and can be collected in a separate fraction.

17 Claims, 2 Drawing Sheets

CLEANSING CONTAMINANTS FROM A HETEROGENEOUS MATERIAL USING A SORPTION AGENT

BACKGROUND AND SUMMARY OF THE INVENTION

The sent invention relates to a process for cleansing contaminants, such as oil, PCB, PAH, heavy metals, lipids and the like from a heterogeneous material, such as sand, gravel, earth, oil gravel, asphalt, drill borings ("kaks"), sewage sludge and the like.

Contamination of dissimilar materials for example in connection with industrial equipment, dump locations or beaches which are contaminated by for example an oil spill, is a well known and increasing problem, and large resources are employed to find solutions to purifying such masses. The solutions must be able to be carried out practically and economically. Several reports describe big environmental problems connected with such contaminated materials. In this connection various hydrocarbon compounds are often mentioned such as oil-like compounds, hydrocarbons which either have coupled on chlorine or bromine groups (PCB), or dissimilar types of aromatic compounds (PAH). The said compounds are all soluble in nonpolar solvents. That is to say they are dissolved slightly in water, and in an association that will be energetically favourable to exclude water. By virtue of the water-repelling property these media will readily adhere to solid surfaces, such as stone, gravel and earth. Furthermore water which runs through these materials will not wash away or dilute these hydrophobic solvents.

A number of locations are mapped where such contaminated materials constitute a significant environmental problem.

In addition to the materials consisting of hydrophobic contaminants they will also consist of various heavy metals, which because of their toxicity also represent an environmental problem.

Today it is usual to "clean" such dump materials by combusting the contamination of the stone materials. However this is very expensive since the costs of such burning off is related to the weight of the materials and to the combustion value, that is to say how much energy which can be utilised by such a combustion. Materials from industrial sites or dumps consist mainly of stone/gravel, that is to say the weight is high and the combustion value low.

There is therefore a need for alternative solutions. Such a solution is described in PCT/NO96/00185 which relates to a sorption agent comprising the plant family Sphagnum for the sorption of hydrophobic compounds where the sphagnum plant is substantially wholly or partially dried. The publication also describes the application of the plant material for removing hydrophobic compounds from solutions and emulsions, together with it being employed directly on materials which are contaminated with hydrophobic compounds by being rubbed against the material. For example it is mentioned that the plant material can be rubbed directly against an oil spill for example in a workshop hall.

However there are other problems which must be solved in order to cleanse contaminants from a heterogeneous material, such as stone and earth. In such materials the oil is an integrated part of the material, that is to say it envelops and sticks together with the dissimilar components of the material so that it becomes a relatively viscous, tacky material. Furthermore the material is formed of particles of relatively small size so that one cannot apply the moss for example to "dry" the particles as one for example can dry off a workshop floor.

The present invention aims therefore to produce a solution for cleansing such materials. When an effective absorptive or adsorptive material is added to a material, and the material and the sorption material are kneaded and tumbled together a certain time, the contaminants will, whether they are hydrophobic compounds or for example heavy metals, be transferred from the material to the sorption agent, assuming that the sorption agent has stronger ad- and/or absorptive properties than the material, and that the compounds are detached from the material by the friction which is created during the kneading/tumbling process, or by means of water/solvents. Even for an effective sorption agent this will not be added if the contaminants are solidified and very strongly fixed to particles of the material. Also this problem is aimed to be solved with the present invention.

A further problem in the cleaning of such materials is that the material, such as sand, gravel and earth, with respect to the size of the particles constitutes a heterogeneous mixture, and often comprising a significant proportion of smaller particles, right down to a size of only some few microns in diameter. A problem which cannot be solved with the afore-mentioned invention is therefore separating the sorption agent from these in part very small particles. The present invention therefore aims to solve this problem also.

The present invention describes therefore a process for cleaning various types of materials, such as for example fill materials, gravel, earth and the like by removing the dissimilar contaminants, such as hydrophobic contaminants as for example oil, PCB and PAH, and heavy metals from the materials.

DETAILED DESCRIPTION

Figure 1:
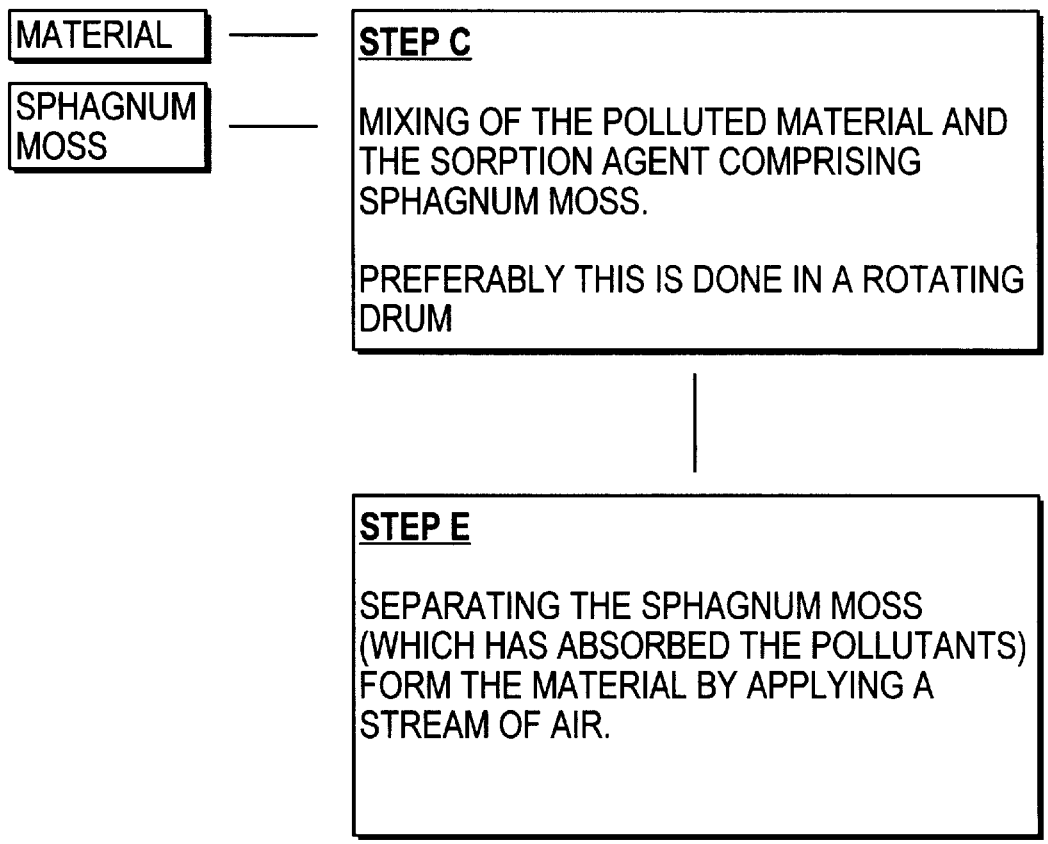
FIG. 1 is a flow diagram of the process of the present invention.
Figure 2:
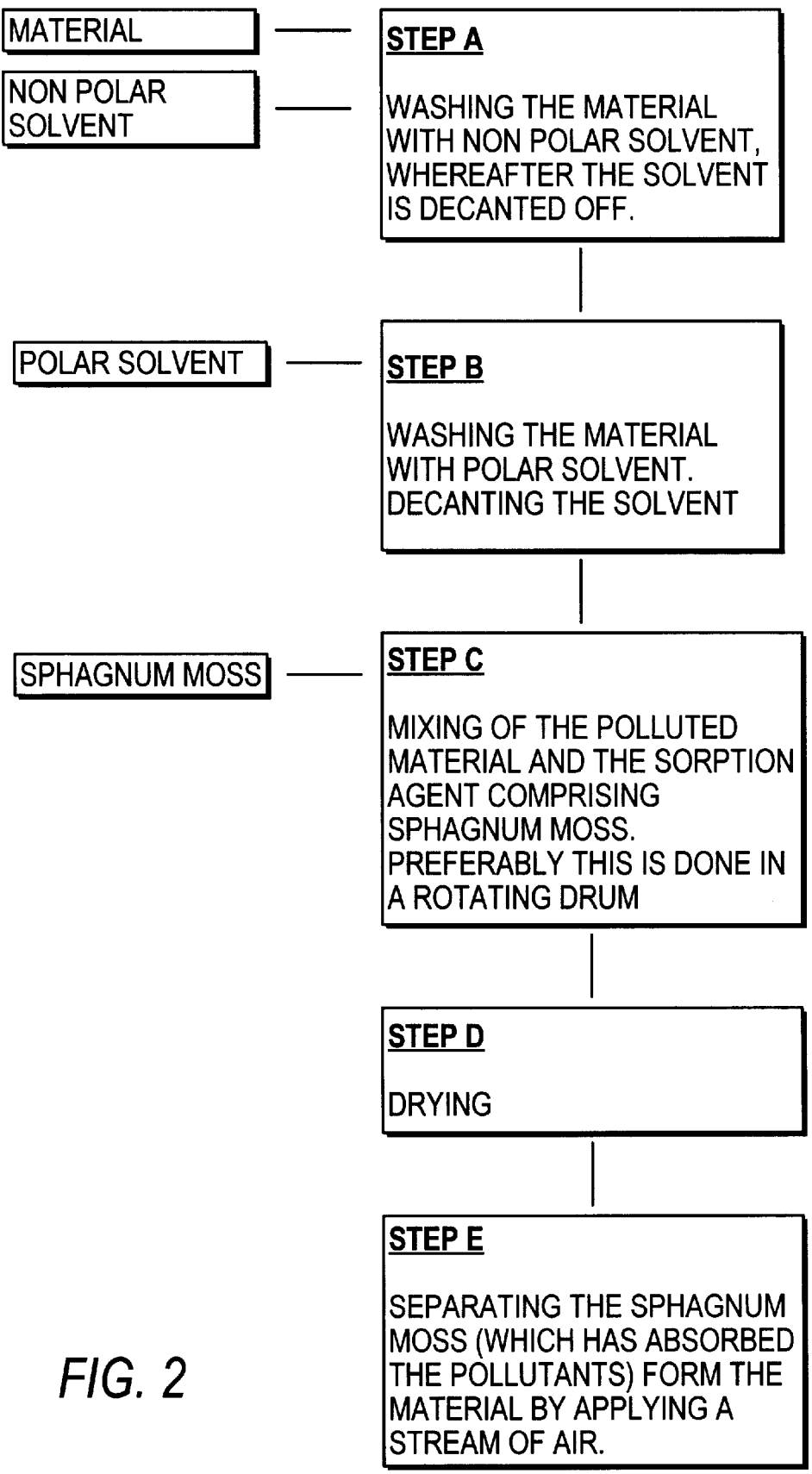
FIG. 2 is a flow diagram of a preferred embodiment of the invention.

By the term "material" is designated any type of material, such as fill material, oil gravel, asphalt, drill cake, sewage sludge, gravel, sand, earth and the like.

The term "sorption agent" designates an agent which has absorptive and/or absorptive properties, that is to say properties for absorbing a compound or adhering to the surface, and/or integrated in the structure of the agent.

The term "solid contaminants" designates contaminants which are relatively strongly adhered to the material. Typically such solid contaminants must be dissolved from the material by applying a non-polar and/or polar solvent.

The present invention describes a process which is characterised by the steps:

c) that a sorption agent is added to the material, and that the material and the sorption agent are mixed/kneaded sufficiently for a considerable portion of the contaminant to be extracted from the material and absorbed by the sorption agent, and that e) the sorption agent is thereafter separated from the material on the basis of specific gravity/particle size by means of an applied gas flow, such as a stream of air, so that the sorption agent is led with the flow and can be collected in a separate fraction.

Further modifications of the invention are evident from the steps:

a) which consists in adding to the material a non-polar solvent, which dissolves "solid" contaminants in the material and makes them soluble in the fluid fraction, and that thereafter the fluid fraction is separated from the material, for example by filtration, decanting, centrifuging and the like, and b) which consists in adding to the material a polar solvent, such a water, added to one or more detergents, which dissolve "solid" contaminants so that these are made soluble in the fluid fraction, and that thereafter the fluid fraction is separated from the material, for example by filtering, decanting, centrifuging and the like and d) which consists in drying the material for example by applying an air flow, and/or that the material is heated.

More specific solutions and embodiments are indicated in the claims 9–17.

A preferred embodiment is therefore to mix together the sorption agent and a contaminated material so that the contaminants are transferred to the sorption agent. Preferably this is carried out in a rotating drum. For the mixing/kneading to be effective it is an advantage, but not a necessity, that the drum is equipped with a number of blades, so that the material and the agent are thoroughly mixed. When a sufficient quantity of the contaminant is transferred to the sorption agent these two fractions must be separated from each other. According to the invention this is carried out by blowing a current of air through the mixture. One way this can be carried out is that the drum with blades rotate during the blowing operation. The blades will then lift the material so that separation is made more efficient. Alternatively the current of air can for example be blown directly through the mixture. The strength of the air current is adapted to the two fractions which are to be separated.

Various types of sorption agents, such as chemical or biological, can be utilised. A preferred solution is to employ bark, peat or moss since these are materials which have a low specific gravity, and are both combustible and biologically degradable. The greater the difference is between the specific gravity of the particles in the material and the specific gravity of the particles of the sorption agent, the more effective is the separation process, that is to say the smaller the strength of the air flow that is required for blowing off the sorption agent, and the smaller the proportion of the smallest particles in the material that will be transferred to the sorption agent fraction. In addition to specific gravity the particle size is an important parameter in the separation process, and it has been found that if the sorption agent particles are of small size so the separation is more effective. If the sorption agent is for example moss so it will be more favourable to cut this up into small particles.

In addition to the direct mixing of material with sorption agent it will be favourable in a number of cases to add a solvent to the material to dissolve and remove a portion of the contaminants before the sorption agent is added. Both non-polar and/or polar solvents can be utilised, and the sequence is determined from the type of contaminant which is to be cleansed from the material. When the solvent has taken effect for a time on the material, generally during the tumbling/kneading where length depends on the type of contaminant and solvent, the fluid fraction is separated from the solid particles with filtering, centrifuging, decanting or in another manner.

In order to increase the solubility of the contaminants it is often favourable to heat the mixture of material and solvent. This is carried out in a known manner, not indicated further.

After the material is treated with solvent, one or more times, so the sorption agent is added. The mixture is kneaded/tumbled so that the sorption agent absorbs the contaminant, and possibly residues of solvent. Thereafter it can be favourable to reduce the moisture content of the sorption agent before the separation process starts. This can be carried out either by air drying, for example by blowing an air current into the mixture, or by heating the mixture, for example due to the drum being equipped with a heating element, possibly a combination of these methods.

The cleansing process according to the invention is specified in some illustrating examples.

EXAMPLE 1

7962 grams of a black, viscous and sticky oil gravel, consisting of particles of an order of magnitude of 5–50 mm are kneaded/mixed in a drum (about 150 liters) together with 1952 grams of diesel oil. The type of oil gravel which is used includes about 10 weight per cent of oil. The object is to remove the oil from the stone/gravel particles. The material and diesel are tumbled together for 5 minutes at a speed of 27 revolutions per minute. The fluid fraction (1598 grams) is strained off (run off time 3 minutes). Thereafter a water solution consisting of 102 grams washing agent/detergent (Zalo) and 985 grams of water is added. The mixture is tumbled for 5 minutes, and the water fraction (1152 grams) is strained from the gravel fraction (run off time 3 minutes).

In these two steps large portions of the oil are now removed. However the gravel particles are coated with a film consisting of detergent/oil/water. If this mixture is dried by evaporating the water the oil will continue to remain as a film on the gravel particles, and thus the problem will not be satisfactorily solved.

To this mixture (detergent/oil gravel/water), where the amount of water is now 1265 grams there is added 1109 grams, dried Sphagnum moss. The moss is cut up and consists of particles having a size in the range of 0.1–10 mm. The mixture is tumbled for 15 minutes. Thereafter the moss is blown away, that is to say separated from the gravel fraction with an applied current of air, and a visual characterization of the gravel particles shows that nearly all the oil has gone. Residues of the oil cannot be seen on the gravel particles.

EXAMPLE 2

Ditch gravel (10026 grams), which is gravel/sand particles having a size in the range of 0.1–10 mm, and a moisture content of about 10%, is added to Troll—crude oil (956 grams). To this mixture of oil and gravel is added Sphagnum moss (735 grams) in particulate form (0.1–10 mm). The mixture is tumbled for 15 minutes. The moss particles are blown off, and the gravel fraction appears completely clean, free from oil and moss, while the moss fraction is free of gravel particles. However there is a slight odour of oil from the gravel particle fraction.

EXAMPLE 3

Ditch gravel (10832 grams), of the same type as above, is added to Troll crude oil (699 grams). To this mixture there is added a mixture of water (1056 grams) and washing agent, of the Zalo type, (101 grams). The mixture is mixed/kneaded in a rotating drum for 10 minutes. Thereafter the water is removed. Run off 5 minutes. To the mixture is added 684 grams moss, and it is tumbled for 10 minutes. The moss fraction is blown off. The gravel mixture appears completely clean, and no odour of oil is observed from this fraction now. The moss is free of gravel particles.

In relation to Example 2 the extra washing step which is introduced has caused the moss to become somewhat cleaner. The reason for this is that the detergent/water mixture which is employed dissolves, that is to say makes water-soluble, the oil fraction which is most strongly adhered to the gravel particles.

EXAMPLE 4

Brown earth (11312 grams) having a particle size in the range of from 0.1–10 mm, and having a moisture content of about 15% is added to Troll—crude oil (953 grams). To this mixture is added 794 grams moss in particulate form. There is tumbling for 20 minutes, after which the moss is blown off. The earth fraction appears completely clean, only a slight odour of oil, and consists of spherical particles (0.2–1 cm). The moss fraction does not contain earth particles.

The Example with earth is conducted in order to illustrate how for example sewage sludge can be treated in order to cleanse this for example of heavy metals. The Examples show that a process in accordance with the present invention can clean a material which is contaminated aminated by various types of compounds. Very often such materials consist however of various oil-like compounds, and the Examples are therefore carried out by utilising oil. By a visual characterization it is assumed that the gravel/earth fractions include less than 0.1% oil, that is to say that more than 99% of the oil is removed. By a correct adaptation of the air pressure during the separation the moss fraction is not contaminated by stone/earth particles.

There is in progress now a chemical characterization of the various fractions. The effect which is achieved with the method is very surprising, and makes a particularly curlarly important contribution to the possibility of taking care of the environment in a better manner by effectively clearing it of contaminated materials.

Dried Sphagnum moss is a material of very low specific gravity, and relative to stone/gravel the specific gravity of the moss is considerably less. Even after the moss has absorbed the oil contamination the specific gravity is considerably lower than for stone/gravel. This fact is employed in order to separate the oil-containing moss from the gravel particles.

Since the quantity of water in the sorption agent will be reduced during drying an effect is obtained proportionate to composting and/or combustion of the sorption agent in that the weight of the contaminant-containing fraction is reduced. Costs of composting and combustion are related to the weight of material. In addition the costs are related to the combustion value of the material, and this will also increase as the moisture content of the material is reduced.

By utilising the separation technique according to the present invention the gravel fraction which is left in the drum after the cleaning process will be nearly completely clean, both with respect to oil, diesel, water and sorbent. The sorbent has correspondingly absorbed nearly all the oil, the diesel and the water, except that this fraction is not significantly contaminated with gravel particles to a particular degree.

In this way there are two fractions which can be treated in a dissimilar manner. The gravel fraction can be employed as if it were free of contamination. The moss fraction can be either composted or burned. The big gain lies in the contamination being transferred to a much lighter fraction, which can be processed much more simply, cheaply and better than the contaminated gravel fraction.

The process according to the invention will also be able to be employed for cleansing heavy metals and oil from the gravel fractions in drill borings ("kaks")). Drill borings is a collective term for the fraction which is taken up in the boring of new bore holes and consists largely of stone/gravel particles released in a fraction of drill sludge. The sludge is separated from the borings by known methods, but the problem is that the borings include a coating of oil-type compounds and heavy metals. By mixing these drill borings with a sorption agent and by using the process according to the invention these contaminants aminants can be removed from the borings. On cleansing bore drillings the process can also include the step (b) so that the heavy metals are dissolved in a watery fraction, in order thereafter to be absorbed by the sorbent together with the water. Thereafter the water is dried off by heating/air flow so that the heavy metals are concentrated in the sorbent. In this way the heavy metals and the oil compounds are separated from the borings, and cleansing of such borings is therefore comprised by the scope and idea of the invention.

What is claimed is:

1. A process for cleansing contaminants from a heterogeneous material, comprising:

adding a sorption agent comprising sphagnum plants to the heterogenous material, and mixing the material and sorption agent for a sufficient time to extract a substantial portion of the contaminant from the material and absorption of the contaminant to the sorption agent; and separating the sorption agent from the material on the basis of specific gravity/particle size by applying a gas flow so that the sorption agent is led with the flow and can be collected as a separate fraction.

2. The process according to claim 1 further comprising adding a non-polar solvent which dissolves solid contaminants in the material and makes these soluble in the solvent prior to mixing the sorption agent with the material, and thereafter separating the contaminant containing solvent from the material.

3. The process in accordance with claim 2, comprising heating the mixture of material and added solvent to increase the solubility of the solid contaminants.

4. The process of claim 1 further comprising adding to the material a polar solvent which dissolves solid contaminant so that these become soluble in the fluid fraction prior to mixing the material with the sorption agent, and thereafter separating the fluid fraction from the material.

5. The process of claim 4 further comprising heating the mixture of material and polar solvent to increase the solubility of the solid contaminants.

6. The process of claim 5 wherein the material and solvent are heated to a temperature of from 0–98° C.

7. The process of claim 4, wherein said polar solvent is water.

8. The process of claim 4 wherein said polar solvent comprises water and a detergent selected from the group consisting of conventional washing agents, cationic detergents, anionic detergents, zwitterionic detergents and non-polar detergents.

9. The process of claim 1 further comprising drying the material and the sorption agent prior to separating the sorption agent from the material.

10. The process of claim 9, wherein an applied stream of air is used in the drying step.

11. The process of claim 9 wherein drying step is carried out by heating.

12. The process of claim 11 wherein the drum rotates with a speed in the range of 5–100, revolutions per minute and wherein a drum time duration is from 1–600 minutes.

13. The process of claim 12, wherein the mixture comprising material and non-polar solvent is heated to a temperature in the range of 0° C. to the boiling point of the solvent.

14. The process of claim 1, wherein mixing step comprises interacting the material and the sorption on solvent agent in a rotating drum.

15. The process of claim 1, wherein said non-polar solvent is selected from the group consisting of diesel, paraffin, white spirit, alkanes, alkenes, alkynes, alcohols, organic acids and aromatic compounds.

16. The process of claim 1 wherein the contaminants are selected from the group consisting of oil, PCB, PAH, heavy metals and lipids.

17. The process of claim 1, wherein the heterogeneous material is selected from the group consisting of sand, gravel, earth, oil gravel, asphalt, drill borings and sewage sludge.

* * * * *